United States Patent
Sin

(10) Patent No.: US 10,101,217 B2
(45) Date of Patent: Oct. 16, 2018

(54) METHOD FOR TEMPERATURE DRIFT COMPENSATION OF TEMPERATURE MEASUREMENT DEVICE USING THERMOCOUPLE

(71) Applicant: LSIS CO., LTD., Gyeonggi-do (KR)

(72) Inventor: Yong-Gak Sin, Gyeonggi-do (KR)

(73) Assignee: LSIS CO., LTD., Anyang-si, Gyeonggi-do (KR)

(*) Notice: Subject to any disclaimer, the term of this patent is extended or adjusted under 35 U.S.C. 154(b) by 343 days.

(21) Appl. No.: 15/192,894

(22) Filed: Jun. 24, 2016

(65) Prior Publication Data

US 2016/0377489 A1 Dec. 29, 2016

(30) Foreign Application Priority Data

Jun. 24, 2015 (KR) .................. 10-2015-0090060

(51) Int. Cl.
- G01K 7/13 (2006.01)
- G01K 7/02 (2006.01)
- G01K 7/12 (2006.01)

(52) U.S. Cl.
CPC ............... G01K 7/13 (2013.01); G01K 7/021 (2013.01); G01K 7/12 (2013.01)

(58) Field of Classification Search
CPC ............ G01K 7/12; G01K 7/13; G01K 7/021; G01K 7/02; G01K 15/00; G01K 15/005; G01K 1/20
USPC .................................. 374/1, 3, 181; 702/99
See application file for complete search history.

(56) References Cited

U.S. PATENT DOCUMENTS

| | | | | |
|---|---|---|---|---|
| 3,982,110 A | * | 9/1976 | Kawai | G01K 1/02 341/118 |
| 4,122,719 A | * | 10/1978 | Carlson | G01K 1/026 219/483 |
| 4,133,700 A | * | 1/1979 | Hollander | G01K 7/12 136/222 |
| 4,488,824 A | * | 12/1984 | Salem | G01K 7/13 374/178 |

(Continued)

FOREIGN PATENT DOCUMENTS

CN 87209746 U 2/1988
CN 1047442 C 12/1999

(Continued)

OTHER PUBLICATIONS

European Search Report dated Dec. 5, 2016 issued in corresponding European Application No. 16 17 2481.

(Continued)

Primary Examiner — Daniel S Larkin
Assistant Examiner — Anthony W Megna Fuentes
(74) Attorney, Agent, or Firm — K&L Gates LLP

(57) ABSTRACT

Methods for temperature drift compensation of a temperature measurement device using a thermocouple are presented. In one embodiment, the temperature drift may be compensated for through reference junction compensation alone using a thermistor for reference junction compensation without providing a separate temperature measurement element. Thereby, precision of a measured temperature may not change despite change in temperature of the surroundings measured by the temperature measurement device, and the manufacturing cost may be effectively reduced.

9 Claims, 9 Drawing Sheets

(56) References Cited

U.S. PATENT DOCUMENTS

| | | | | |
|---|---|---|---|---|
| 4,532,601 | A * | 7/1985 | Lenderking | G01K 15/00 374/E1.005 |
| 4,588,308 | A * | 5/1986 | Saito | G01K 7/13 374/170 |
| 4,936,690 | A * | 6/1990 | Goetzinger | G01K 7/13 374/133 |
| 5,150,969 | A * | 9/1992 | Goldberg | G01J 5/02 374/128 |
| 5,669,713 | A * | 9/1997 | Schwartz | G01K 7/13 374/1 |
| 5,735,605 | A * | 4/1998 | Blalock | G01K 7/13 374/179 |
| 5,857,777 | A * | 1/1999 | Schuh | G01K 15/00 374/170 |
| 7,841,771 | B2 * | 11/2010 | Perotti | G01K 15/007 374/170 |
| 8,794,830 | B2 * | 8/2014 | Fang | A61B 18/1492 374/181 |
| 2003/0065467 | A1 * | 4/2003 | Schuh | G01D 3/022 702/99 |
| 2011/0243188 | A1 * | 10/2011 | Aberra | G01K 7/12 374/171 |
| 2012/0179407 | A1 * | 7/2012 | Ge | G01K 1/20 702/99 |
| 2012/0197586 | A1 * | 8/2012 | Zhang | G01K 7/12 702/133 |
| 2014/0269821 | A1 * | 9/2014 | Egley | G01K 1/026 374/54 |
| 2015/0036721 | A1 * | 2/2015 | Lohre | G01K 7/13 374/179 |
| 2015/0276498 | A1 * | 10/2015 | Van Minnen | G01K 7/026 374/181 |
| 2016/0041566 | A1 * | 2/2016 | Sin | G01K 7/00 700/299 |

FOREIGN PATENT DOCUMENTS

| | | |
|---|---|---|
| CN | 201188196 Y | 1/2009 |
| JP | H11-506837 A | 6/1996 |
| JP | H09-264792 A | 10/1997 |
| JP | 2004-347383 A | 12/2004 |
| JP | 2004347383 A | 12/2004 |
| JP | 2008-107089 A | 5/2008 |
| JP | 2008107089 A | 5/2008 |
| JP | 2016-038385 A | 3/2016 |
| KR | 20-0250401 Y1 | 11/2001 |
| KR | 10-0314438 B1 | 4/2002 |
| KR | 20-0282421 Y1 | 7/2002 |
| KR | 10-0395618 B1 | 8/2003 |
| KR | 10-2008-0090005 A | 10/2008 |
| KR | 20080090005 A | 10/2008 |
| KR | 10-2009-0071905 A | 7/2009 |
| KR | 20090071905 A | 7/2009 |
| KR | 10-1142247 B1 | 5/2012 |
| KR | 10-2013-0042462 A | 4/2013 |
| KR | 10-1323874 B1 | 10/2013 |
| KR | 10-1517147 B1 | 5/2015 |

OTHER PUBLICATIONS

Notice of Allowance dated Jan. 19, 2017 issued in corresponding Korean Application No. 9-5-2017-005141364.

Notice of Allowance dated May 16, 2017, for counterpart application.

Chinese Office Action for related Chinese Application No. 201610460994.4; action dated May 22, 2018; (5 pages).

* cited by examiner

FIG. 8

| STEP | 200 RESISTANCE (kΩ) | | | 201 THERMISTOR VOLTAGE | 202 NON-COMPENSATED CONVERSION COUNT | 203 Temperature Difference with Respect to 25°C | 205 COMPENSATION FACTOR | 206 COMPENSATED CONVERSION COUNT |
|---|---|---|---|---|---|---|---|---|
| TEMP. (°C) | MIN | CENTER | MAX | CENTER | CENTER | | COMPENSATION COEFFICIENT = 1.1 | COMPENSATION COEFFICIENT = 1.1 |
| ... | ... | ... | ... | ... | ... | ... | ... | ... |
| 24 | 10.3290 | 10.3840 | 10.4390 | 0.1038 | 5624 | 1 | 1.1 | 5562 |
| 25 | 9.9500 | 10.0000 | 10.0500 | 0.1000 | 5416 | 0 | 0.0 | 5416 |
| 26 | 9.5816 | 9.6323 | 9.6830 | 0.0963 | 5217 | 1 | 1.1 | 5274 |
| ... | ... | ... | ... | ... | ... | ... | ... | ... |

METHOD FOR TEMPERATURE DRIFT COMPENSATION OF TEMPERATURE MEASUREMENT DEVICE USING THERMOCOUPLE

CROSS REFERENCE TO RELATED APPLICATIONS

This application claims the benefit of Korean Patent Application No. 10-2015-0090060, filed on Jun. 24, 2015, entitled "METHOD FOR TEMPERATURE DRIFT COMPENSATION OF TEMPERATURE MEASUREMENT DEVICE USING THERMOCOUPLE", which is hereby incorporated by reference in its entirety.

BACKGROUND

Technical Field

The present disclosure relates to a method for temperature drift compensation of a temperature measurement device using a thermocouple.

Description of the Related Art

Conventionally, a temperature measurement device using a thermocouple is provided with a compensation circuit to compensate for influence of the temperature of the surroundings, which is unnecessary. The compensation circuit is implemented by providing a reference voltage generating circuit to an input terminal or providing a temperature sensor and a multiplexer to the input terminal. In particular, the temperature sensor and multiplexer are added to reduce complexity and errors of providing the reference voltage generating circuit.

For a temperature measurement device using a temperature sensor and multiplexer, when the temperature of the place where the temperature measurement device is installed changes, the conventional technology produces an error in measuring temperature due to temperature drift.

Herein, drift refers to change in a measured value with a change of the environment. The most significant drift observed by various sensors is typically caused by change in temperature of the surroundings, which is called "temperature drift."

To maintain high precision in temperature measurement, a temperature compensation function needs to be provided or a sensor needs to be installed in a pyrostat so as to be maintained at a constant temperature. In addition to the temperature drift, aging drift, which results from aging of an element in use, is also considered important. This drift is an important element in determining the period of correction of a sensor or guage.

The thermocouple is a device for measuring temperature in a wide range using the Seebeck effect. Thermocouples are used in a power plant, steel mill, and the like, and are widely used in extreme situations due to high durability thereof.

A temperature measurement device using the thermocouple measures a temperature using electromotive force generated in the thermocouple. Herein, the measured temperature has a value measured with respect to 0° C. Accordingly, the temperature around a part of the measurement device to which the thermocouple is actually connected is measured and added to the measured value. This compensation is referred to as reference junction compensation or cold junction compensation.

Conventionally, to compensate for the temperature drift, a separate temperature measurement circuit is implemented in the temperature measurement device, or the temperature around a part to which a product is mounted is maintained to be constant.

However, the conventional temperature measurement device using a thermocouple needs to perform the reference junction compensation to measure a temperature. However, this procedure has a limit in compensating for an error resulting from the temperature drift. That is, an external cause of temperature change sensed by a thermistor for reference junction compensation and an internal cause of temperature change are not delivered with a constant ratio.

Accordingly, to overcome such limit, a separate means to correct the temperature drift is needed. Such means typically requires a separate temperature measurement element capable of sensing change in temperature of the surroundings.

SUMMARY

Some embodiments of the present disclosure devised to solve the problem above is directed to compensation for temperature drift through reference junction compensation alone using a thermistor for reference junction compensation rather than using a separate temperature measurement element. Accordingly, it is an aspect of some embodiments of the present disclosure to provide a method for temperature drift compensation of a temperature measurement device using a thermocouple which may ensure that precision of temperature measurement does not change despite change in temperature of the surroundings and effectively reduce manufacturing costs.

In accordance with one aspect of some embodiments of the present disclosure, a method for compensating for temperature drift of a temperature measurement device including a thermocouple and a thermistor for reference junction compensation through the reference junction compensation includes: acquiring an analog voltage of the thermistor through a constant current source; converting the acquired analog voltage into a digital count; calculating a temperature difference between each temperature from an RT table showing resistance values according to temperatures of the thermistor and a predetermined reference room temperature; calculating a compensation factor by multiplying the calculated temperature difference by a predetermined compensation coefficient; calculating a compensated digital count using the converted digital count and the calculated compensation factor, based on the predetermined reference room temperature; and measuring a temperature of the thermocouple through the reference junction compensation using a temperature of the thermistor corresponding to the compensated digital count.

Herein, the predetermined reference room temperature is preferably between 20° C. and 30° C.

Preferably, the predetermined compensation coefficient may be set in proportion to a difference in the temperature drift, and have a value between 0.5 and 1.5.

Preferably, the compensated digital count may be calculated by Equation 1 given below:

Compensated digital count=the converted digital count×(100+the compensation factor)%.  Equation 1

Preferably, when a temperature actually measured by the thermistor at a temperature below 0° C. is higher than an ideal measured temperature, and a temperature actually measured by the thermistor at a temperature above 0° C. is lower than an ideal measured temperature, a negative sign (−) may be applied to the compensation factor when the temperature of the thermistor is lower than the predetermined reference room temperature, a positive sign (+) may be applied to the compensation factor when the temperature of the thermistor is higher than the predetermined reference room temperature, '0' may be applied to the compensation factor when the temperature of the thermistor is equal to the predetermined reference room temperature.

Preferably, when a temperature actually measured by the thermistor at a temperature below 0° C. is lower than an ideal measured temperature, and a temperature actually measured by the thermistor at a temperature above 0° C. is higher than an ideal measured temperature, a positive sign (+) may be applied to the compensation factor when the temperature of the thermistor is lower than the predetermined reference room temperature, a negative sign (−) may be applied to the compensation factor when the temperature of the thermistor is higher than the predetermined reference room temperature, '0' may be applied to the compensation factor when the temperature of the thermistor is equal to the predetermined reference room temperature.

Preferably, the predetermined compensation coefficient may be adjusted through a trial and error method.

As is apparent from the description above, according to a method for temperature drift compensation of a temperature measurement device using a thermocouple according to an embodiment of the present disclosure, the temperature drift may be compensated for through reference junction compensation alone using a thermistor for reference junction compensation without providing a separate temperature measurement element. Thereby, precision of a measured temperature doesn't change despite change in temperature of the surroundings measured by the temperature measurement device, and the manufacturing cost may be effectively reduced.

In addition, according to an embodiment of the present disclosure, the temperature drift may be corrected through implementation of firmware without an additional circuit or device for the temperature drift compensation. Further, the temperature drift compensation may be enabled in a product including fixed hardware, providing the effect of cost reduction. Moreover, the cost of implementation of a module may be reduced, and the disadvantage of the conventional method may be overcome. Further, utility of efficient configuration for a method for temperature drift compensation of the temperature measurement device using a thermocouple may be provided by eliminating configuration complexity of the conventional method.

BRIEF DESCRIPTION OF THE DRAWINGS

FIG. 8 is a table describing actual calculation in each step when the compensation coefficient of FIG. 7 is 1.1, according to an embodiment of the present disclosure.

DETAILED DESCRIPTION

Figure 1:
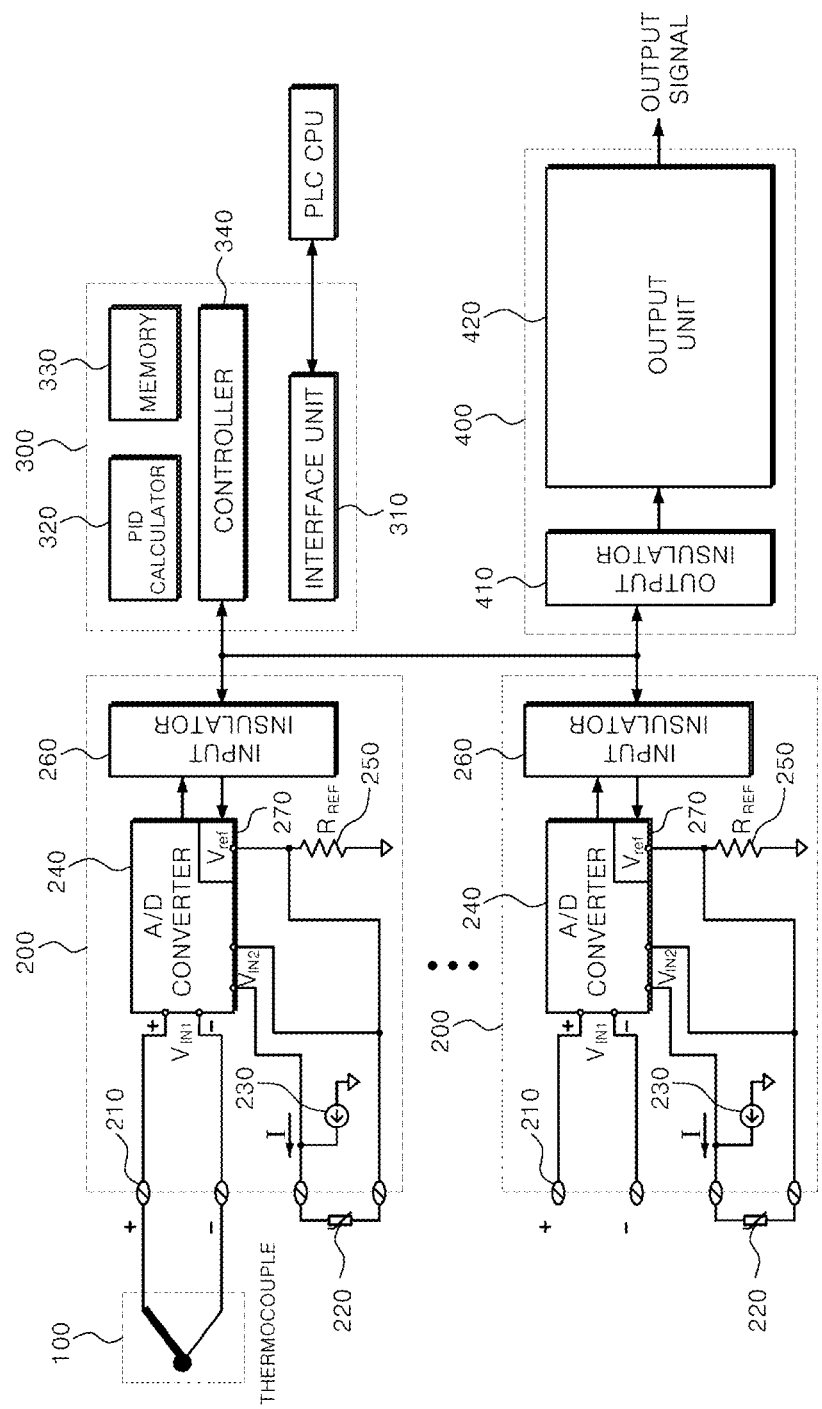
FIG. 1 is a block diagram illustrating a temperature measurement device using a thermocouple according to an embodiment of the present disclosure.

The aforementioned objects, advantages and features of the disclosure will be set forth in detail with reference to the accompanying drawings such that those skilled in the art can easily practice the present disclosure. In describing the present disclosure, a detailed description of well-known technologies will be omitted if it is determined that such description can unnecessarily obscure the main points of the present disclosure. Hereinafter, embodiments of the present disclosure will be described in detail with reference to the accompanying drawings. It should be understood that the present disclosure is not limited to the following embodiments, but may be implemented in various different forms. The embodiments are provided for making the disclosure of the present disclosure thorough and for fully conveying the scope of the present disclosure, which is defined only by the accompanying claims and equivalents thereof, to those skilled in the art. Like reference numerals are used to refer to the same or like elements throughout the drawings.

Figure 2:
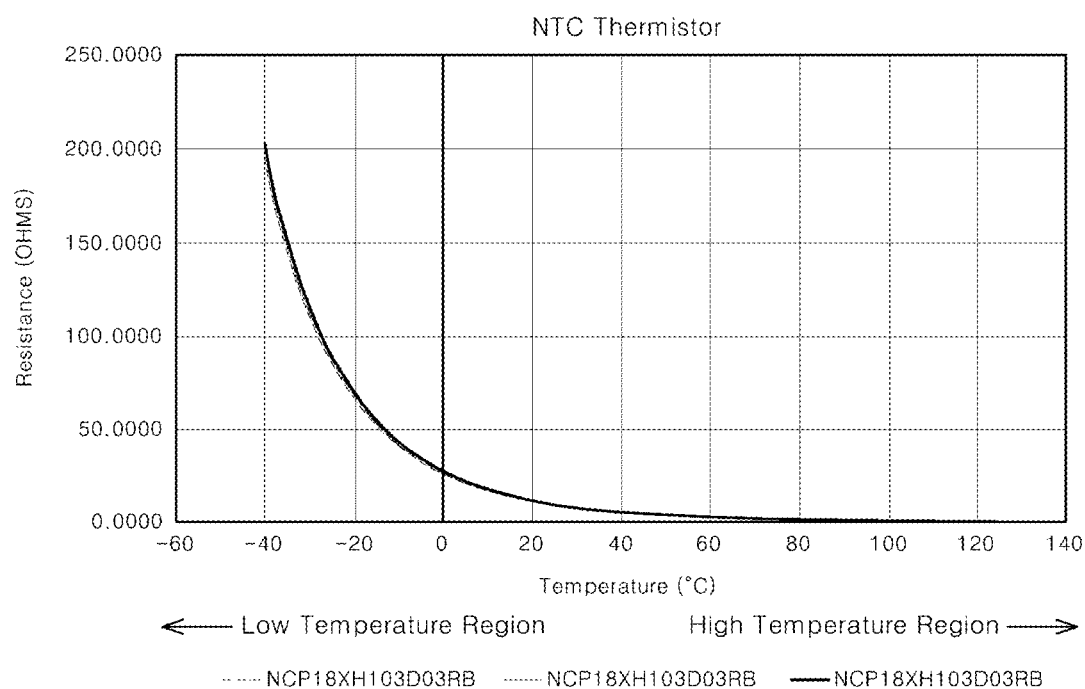
FIGS. 2 and 3 are graphs depicting typical resistance-temperature (R-T) characteristics of a thermistor for reference junction compensation according to an embodiment of the present disclosure.
Figure 3:
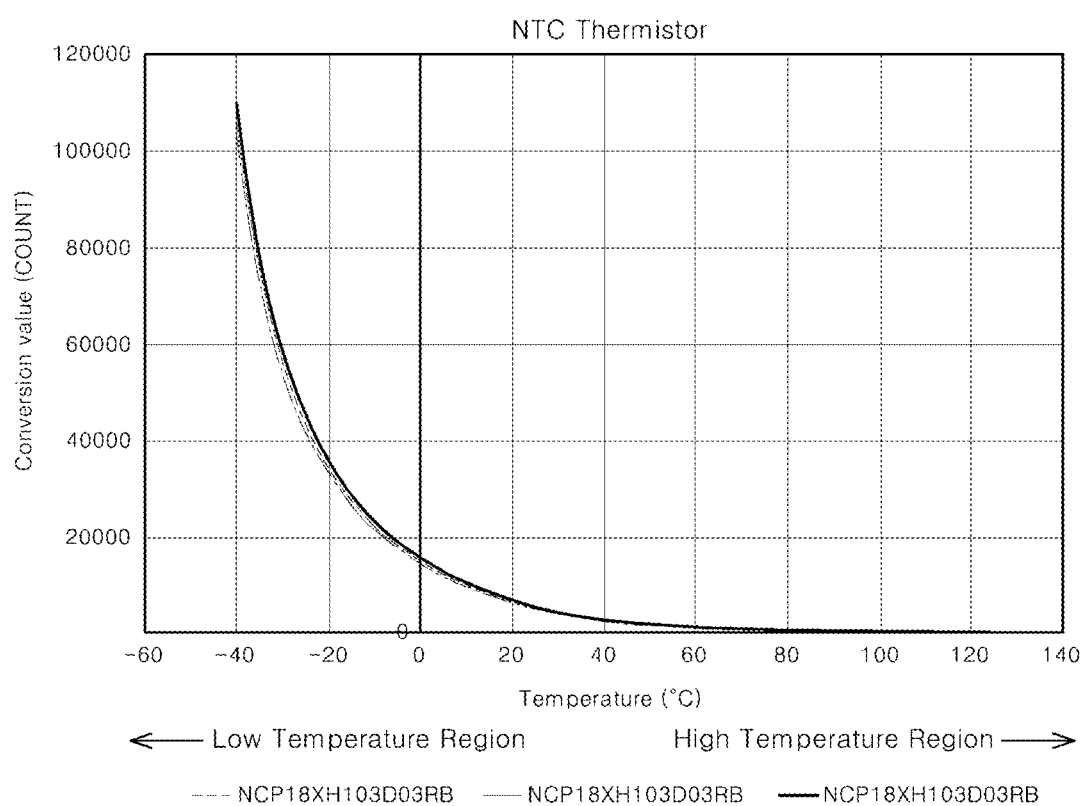

FIG. 1 is a block diagram illustrating a temperature measurement device using a thermocouple according to an embodiment of the present disclosure, and FIGS. 2 and 3 are graphs depicting typical resistance-temperature (R-T) characteristics of a thermistor for reference junction compensation according to an embodiment of the present disclosure.

Referring to FIGS. 1 to 3, a temperature measurement device using a thermocouple according to an embodiment of the present disclosure includes a thermocouple 100, an input module 200, a control module 300 and an output module 400.

Herein, the thermocouple 100 serves to convert the temperature of a measured object into thermal electromotive force to output an analog voltage signal. Accordingly, the thermocouple 100 is formed by joining two different materials in the form of a link.

That is, the Seebeck effect, which refers to generation of electromotive force according to a difference in temperature between the junctions of the thermocouple 100, namely a hot junction and a cold junction, is used. The thermocouple 100 may provide a method for sensing temperatures in several processes in, for example, a nuclear reactor, aircraft, power system and steel mill. In addition, the thermocouple is a temperature measurement sensor which is simple in terms of structure, inexpensive and durable and is capable of relatively accurately measuring temperatures in many applications.

When a closed circuit is configured using two different kinds of metal, there is no potential difference between two junctions if there is no difference in temperature between the junctions. However, if there is a difference in temperature between the two junctions, contact unbalance of a potential difference occurs between the junctions. This effect is the Seebeck effect. Thereby, a thermoelectric current flows from the cold junction to the hot junction.

The thermocouple 100 is a sensor which is capable of measuring a temperature with accuracy corresponding to an error between about 0.1% and about 1%, provides a simple structure to the measurement device, and has low impedance which produces a low noise in the circuit. In addition, the thermocouple 100 is mechanically flexible. Accordingly, the form of the thermocouple 100 may be appropriately changed according to applications and thermocouple 100 may be made in the form of a wire in consideration of fast response, durability and insulation of the circuit.

The thermocouple 100 may be divided into various types according to the kinds of metal thereof and may be selectively used according to limits and conditions.

The input module 200 serves to receive an analog voltage signal of the thermocouple 100 for the value of temperature of an object to be measured and convert the same into a digital voltage signal. The input module 200 includes an input terminal 210 for connecting the thermocouple 100, a thermistor 220 for reference junction compensation, a constant current source 230 for generating an output current, an analog/digital (A/D) converter 240 for converting the analog voltage signal into a digital value, a reference resistor 250 for generating a reference voltage of the A/D converter 240, and an input insulator 260 for insulating the input module 200 and the control module 300.

Preferably, the input insulator 260 is formed of, for example, an opto-coupler. The input insulator 260 functions to insulate the input module 200 and the control module 300. That is, the input insulator 260 is intended for reliability of the temperature measurement device, and thus serves to interrupt noise, a surge current and a surge voltage between the input module 200 and the control module 300.

A reference voltage Vref applied through a reference voltage input terminal 270 of the A/D converter 240 determines a range of input signals acceptable by the A/D converter 240.

The electromotive force generated in the thermocouple 100 ranges from a few μV to tens of mV. To convert an analog voltage signal into a digital value, the input signal needs to be amplified. Although not shown in the figure, an amplification circuit is preferably positioned between the input terminal 210 and the A/D converter 240, and may be included in the A/D converter 240.

The control module 300 performs PID (proportional integral differential) control by comparing a measured temperature value converted in the input module 200 with a predetermined target value. The control module 300 includes an interface unit 310 for receiving predetermined parameters from an external device (e.g., PLC CPU), a PID calculator 320 for calculating an adjusted value by performing PID control with the measured temperature value converted in the input module 200 and the predetermined target value, a memory 330 for storing the predetermined parameters and the adjusted value, and a controller 340 for determining the type of a signal input to the input module 200 using the predetermined parameters, controlling the input module 200 to convert an input analog signal into a digital signal according to the type of the signal, generating a pulse width modulation (PWM) control signal using the adjusted value calculated by the PID calculator 320 and the predetermined parameters, and transmitting the PWM control signal to the output module 400 to control the output module 400 to output the adjusted value.

Herein, the interface unit 310 receives predetermined parameters necessary for operation of the temperature measurement device by performing data communication with, for example, a PLC CPU. Herein, the predetermined parameters include an input parameter, a control parameter and an output parameter.

The input parameter contains information about the input sensor type of the temperature measurement device, and the control parameter contains information such as a PID setting coefficient necessary for PID control. The output parameter contains information about the type of output such as hot output or cold output and information about the output type such as analog output or on/off output.

The PID calculator 320 compares a digital value obtained through conversion in the A/D converter 240, namely a measured value with a predetermined target value. If there is a difference between the measured value and the target value, the PID calculator 320 performs PID calculation by calculating an adjusted value for making the measured value reach the target value.

The memory 330 stores predetermined parameters received from the interface unit 310 and the adjusted value calculated by the PID calculator 320.

The controller 340 determines the type of a signal input to the input module 200 using the input parameter among the predetermined parameters received from the interface unit 310. Then, the controller 340 generates on the A/D conversion control signal for controlling operation of the A/D converter 240 according to the type of the signal input to the input module 200.

In addition, the controller 340 controls the PID calculator 320 to perform PID calculation by comparing the measured value and the target value, and stores the adjusted value calculated by the PID calculator 320 in the memory 330.

The controller 340 also generates a PWM control signal for the adjusted value of the PID calculator 320 and delivers the same to the output module 400. The PWM control signal contains information about the output type and information about the output form.

The output module 400 outputs a result value of PID control according to control of the control module 300. The output module 400 includes an output insulator 410 for insulating the control module 300 and the output module 400, an output unit 420 for outputting an adjusted value calculated and processed according to the PWM control signal. Herein, the output unit 420 is provided with wiring for cold output and wiring for hot output.

Similar to the input insulator 260, the output insulator 410 is preferably formed of an opto-coupler. The output insulator 410 functions to insulate the control module 300 and the output module 400, thereby securing reliability of the temperature control device.

The output unit 400 may output analog output or on/off output according to the information about the output form contained in the PWM control signal. In addition, the output unit 400 may provide output through wiring for hot output or wiring for cold output according to the information about the type of output contained in the PWM control signal.

The temperature measurement device using a thermocouple configured as above uses a temperature value measured by the thermistor 220 for reference junction compensation. A narrative temperature coefficient (NTC) thermistor including a negative (−) temperature coefficient is a 2-terminal component producing change in resistance corresponding to change in temperature of the surface thereof, as shown in FIGS. 2 and 3.

Change in temperature of the thermistor occurs due to an external cause and an internal cause. The external cause is change in temperature of the surroundings of the thermistor, and the internal cause is temperature change according to heat generated from a current flowing through an element. A combination of these two causes results in change in temperature of the thermistor. The NTC thermistor is fabricated using metal oxides of metal such as manganese, nickel, cobalt, copper, and iron.

In addition, the thermistor undergoes resistance change between about −3%/° C. and about −6%/° C. with respect to about 25° C. This relationship between resistance and temperature complies with an approximate exponential curve as shown in FIG. 2. One method to obtain the curve of the NTC thermistor is to measure a slope of the resistance-to-temperature curve at a fixed temperature, and the temperature coefficient α of a resistor is defined by the following equation.

$$\alpha = \frac{1}{R} * \frac{dR}{dT}$$

Herein, T is a temperature (in ° C. or K), and R is resistance at temperature T.

As shown in FIG. 2, the steepest slope on the NTC curve appears in a low temperature region, and the temperature coefficient increases by about −8%/° C. at about −40° C., which varies slightly depending on the material constituting the NTC thermistor. The flat section on the NTC curve appears in a high temperature region, and resistance change within about 1%/° C. occurs at about 300° C.

Herein, the temperature coefficient α, which may be used in comparing relative slopes of the NTC curve, is an important element in comparing temperature coefficients α at the same temperature. That is, the temperature coefficient α changes greatly within the same operational temperature range, and therefore the manufacturer of the thermistor provides a temperature coefficient such that users can recognize the range of temperature change.

Typically, the resistance value of the thermistor is determined based on the middle value in the range of change of resistance at a specific temperature. Basically, the thermistor including nonlinearity in the low temperature and high temperature regions senses temperature change according to the aforementioned external cause and internal cause. These characteristics are closely related to the hardware properties of the actually manufactured temperature controller.

Accordingly, if temperature compensation is performed based on the resistance value of the thermistor provided by the manufacturer of the thermistor, change in resistance, which may vary according to the hardware properties and the change in temperature of the surroundings, cannot be reflected. Thereby, a compensation error is very likely to change according to the temperature of the surroundings.

Figure 4:
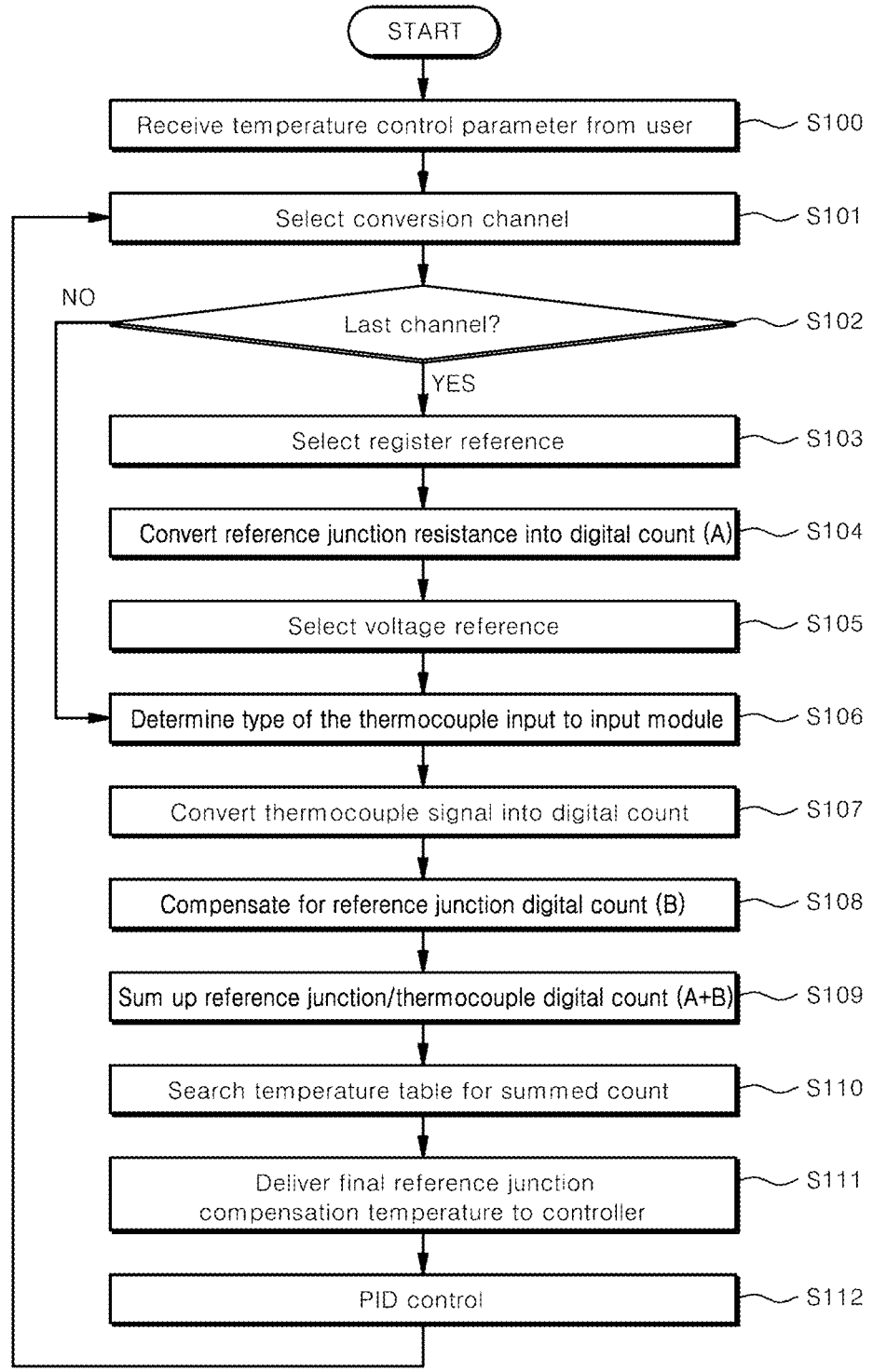
FIG. 4 is a flowchart illustrating operation of a temperature measurement device using a thermocouple according to an embodiment of the present disclosure.

FIG. 4 is a flowchart illustrating operation of a temperature measurement device using a thermocouple according to an embodiment of the present disclosure.

Referring to FIG. 4, parameters necessary for temperature control is received from a user (S100). Then, the thermocouple 100 connected to each channel or a channel for reference junction compensation is selected (S101).

Then, it is determined whether the channel selected in S101 performs thermocouple conversion for the first time or the thermocouple conversion is performed through the last channel (S102). If thermocouple conversion is performed for the first time or through the last channel, conversion for reference junction compensation is performed (S103 and S104).

Thereafter, conversion for the thermocouple channel is performed (S105 to S107). At this time, a changed reference junction digital count is applied (S108) to obtain a final temperature reflecting temperature drift compensation, which is the biggest difference from the conventional technology as will be described in detail later.

Next, reference junction/thermocouple digital counts are summed up (S109), and the sum of the counts is searched for in the temperature table (S110). As the last step of temperature measurement, a temperature including undergone reference junction compensation is delivered to the controller 340 (see FIG. 1) (S111). Thereafter, the temperature control module performs PID control (S112). For a simple measurement module, this operation is omitted.

To implement the reference junction digital count compensation (S108), a compensated reference junction table needs to be calculated. This is intended to perform compensation for the temperature drift in the measurement circuit as well in the procedure of reference junction compensation. Specifically, this is intended to perform temperature drift compensation through reference junction compensation alone without a separate temperature sensor.

First, to identify the property of temperature drift of a designed measurement circuit, a profile of a certain measured temperature according to change in temperature of the surroundings is detected using a device such as a pyrostat or humidistat.

Figure 5:
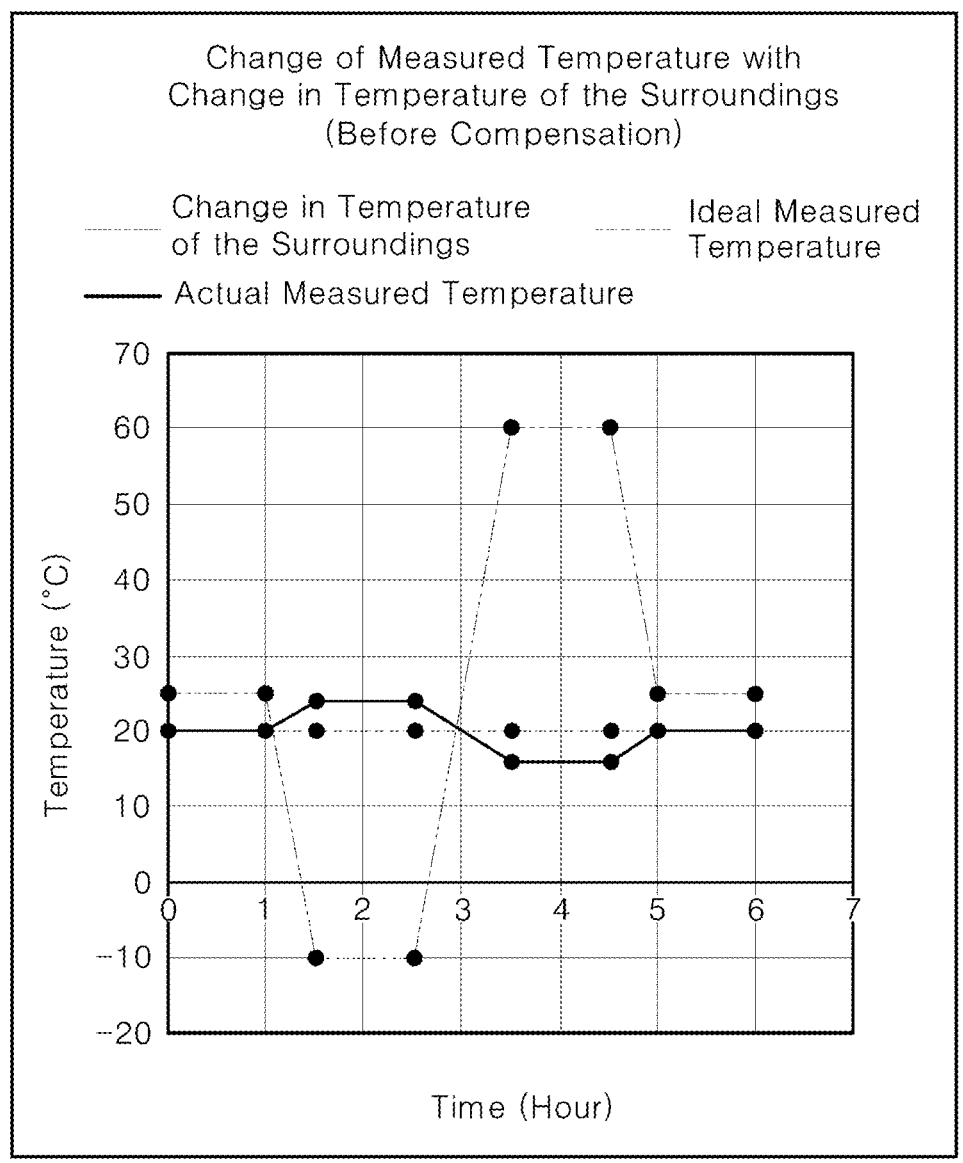
FIG. 5 is a graph depicting change of measured temperature with change in temperature of the surroundings of a thermocouple (before compensation) according to an embodiment of the present disclosure.
Figure 6:
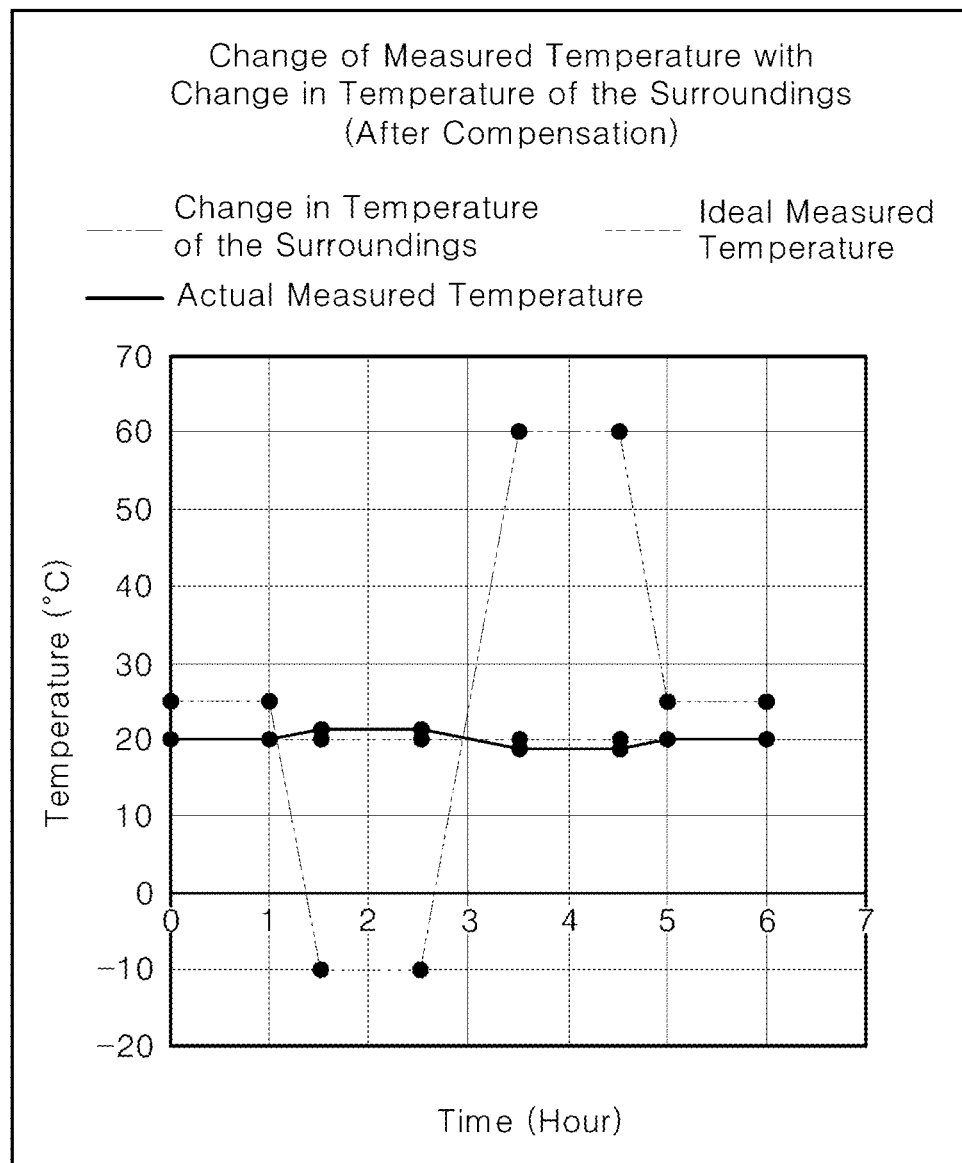
FIG. 6 is a graphic depicting change of measured temperature with change in temperature of the surroundings of a thermocouple (after compensation) according to an embodiment of the present disclosure.

FIG. 5 is a graph depicting change of measured temperature with change in temperature of the surroundings of a thermocouple (before compensation) according to an embodiment of the present disclosure, and FIG. 6 is a graphic depicting change of measured temperature with change in temperature of the surroundings of a thermocouple (after compensation) according to an embodiment of the present disclosure.

Referring to FIG. 5, for change in measured temperature (prior to compensation) according to change in temperature of the surroundings of the thermocouple 100 (see FIG. 1), Temperature 20° C. is measured at a room temperature (25° C.). However, the measured temperature increases to 24° C. when the temperature of the surroundings decreases to −10° C., and decreases to 16° C. when the temperature of the surroundings increases to 60° C.

That is, although the range of actual temperature change depends on the structure or configuration of the circuit and mechanism, the aforementioned profile is typically given. In the ideal case, the measured temperature 20° C. is maintained (as indicated by a red dotted line in FIG. 5) irrespective of change in temperature of the surroundings.

Referring to FIG. 6, change in measured temperature (after compensation) according to change in temperature of the surroundings of the thermocouple 100 (see FIG. 1) is obtained by applying a compensated reference junction temperature table according to an embodiment of the present disclosure. That is, some embodiments of the present disclosure intends to obtain an actually measured temperature as close to the ideal measured value as possible.

An error in the resistance value of the thermistor 220 (see FIG. 1) applied to reference junction compensation is expressed as shown in FIG. 2. Thereby, to perform temperature drift compensation for overall hardware, change of the resistance value is under-reflected in the low temperature region for the temperature of the surroundings, and is over-reflected in the high temperature region for the temperature of the surroundings. In FIG. 3, the y-axis represents A/D conversion count in place of resistance of FIG. 2.

Figure 7:
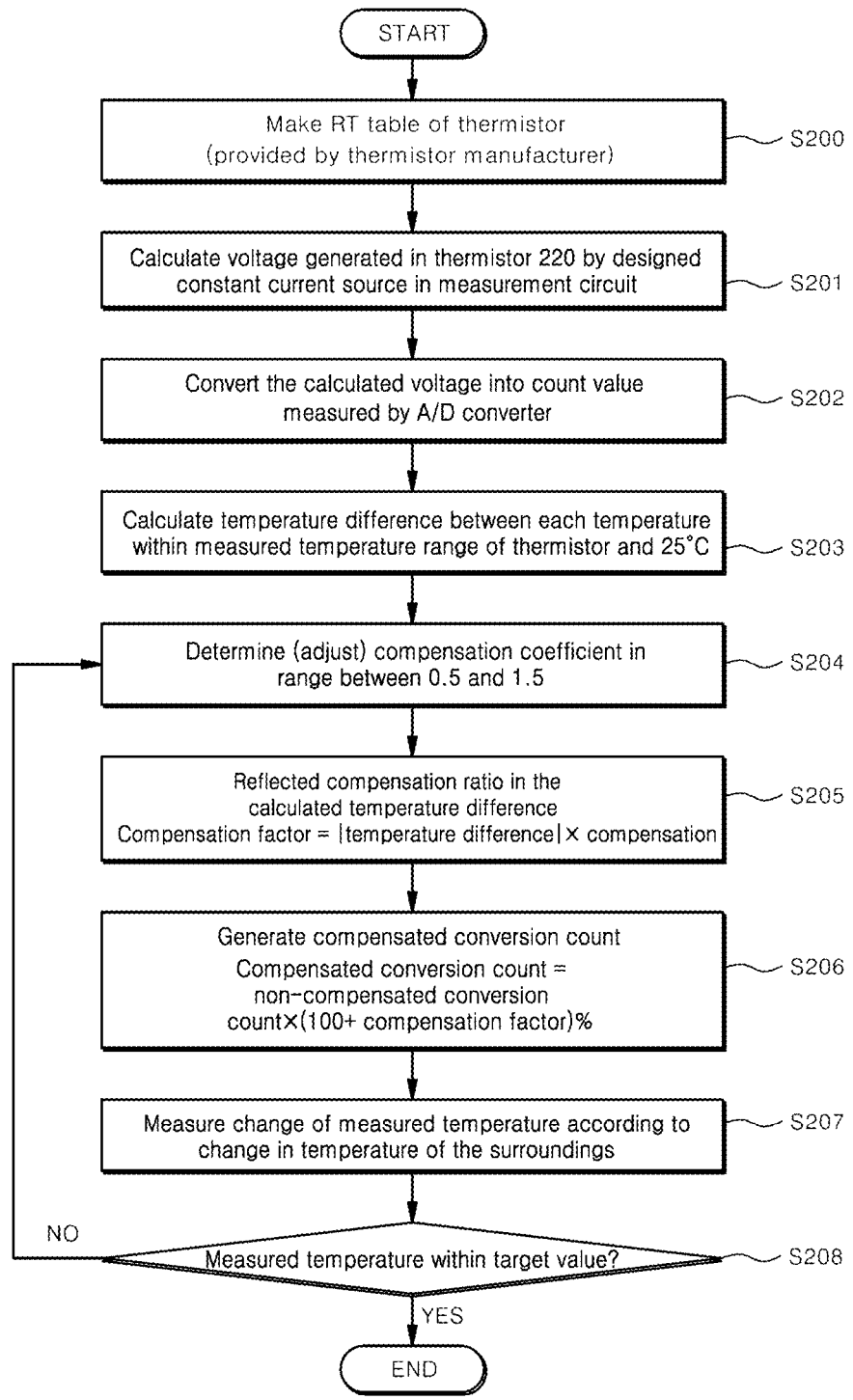
FIG. 7 is a flowchart illustrating a method for temperature drift compensation of a temperature measurement device using a thermocouple according to an embodiment of the present disclosure.

FIG. 7 is a flowchart illustrating a method for temperature drift compensation of a temperature measurement device using a thermocouple according to an embodiment of the present disclosure, and FIG. 8 is a table describing actual calculation in each step when the compensation coefficient of FIG. 7 is 1.1.

Referring to FIGS. 7 and 8, in a method for temperature drift compensation of a temperature measurement device using a thermocouple according to an embodiment of the present disclosure, an R-T (resistance-temperature) table of the thermistor 220 (see FIG. 1) provided by the manufacturer of the thermistor is made (S200).

Thereafter, an analog voltage generated in the thermistor 220 by the designed constant current source 230 (see FIG. 1) in the measurement circuit is acquired and calculated (S201). Thereafter, the analog voltage acquired in step S201 is converted into a digital count value measured by the A/D converter 240 (see FIG. 1) (S202).

Then, a difference in temperature between each temperature in the RT table for resistance values according to the temperature of the thermistor made in step S200 and a predetermined reference room temperature (preferably, a temperature between 20° C. and 30° C., and more preferably, about 25° C.) is calculated (S203).

Next, a compensation coefficient is determined (adjusted) (S204). The compensation coefficient is preferably set in proportion to the difference from the temperature drift, and may be set within a range between about 0.5 and about 1.5.

Thereafter, a compensation factor is calculated by multiplying the absolute value of the temperature difference calculated in step S203 by the compensation coefficient predetermined in step S204 (S205).

Then, a compensated conversion count is generated (S206). That is, a compensated digital count is calculated using the digital count converted in step S202 and the compensation factor calculated in step S205, based on the predetermined reference room temperature.

In this case, the compensated digital count may be calculated using Equation 1 below.

Compensated digital count=the converted digital count×(100+Compensation factor)%  Equation 1

Preferably, in the case where a temperature actually measured by the thermistor 220 at a temperature (low temperature) lower than 0° C. is higher than an ideal measured temperature, and a temperature actually measured by the thermistor 220 at a temperature (high temperature) higher than 0° C. is lower than an ideal measured temperature, the negative sign (−) is applied to the compensation factor if the temperature of the thermistor 220 is lower than the predetermined reference room temperature (preferably, a temperature between 20° C. and 30° C., and more preferably, about 25° C.), the positive sign (+) is applied to the compensation factor if the temperature of the thermistor 220 is higher than the predetermined reference room temperature, and '0' is applied to the compensation factor if the temperature of the thermistor 220 is equal to the predetermined reference room temperature.

Thereafter, change in the measured temperature according to change in temperature of the surroundings is measured (S207). Then, it is determined whether the measured temperature is within a target value (S208). If the measured temperature is not within the target value, step S204 is performed again to adjust the compensation coefficient.

Lastly, the temperature of the thermocouple 100 is finally measured through the reference junction compensation using the temperature of the thermistor corresponding to the digital count compensated in step S206 (see S109 and S110 of FIG. 4).

Figure 9:
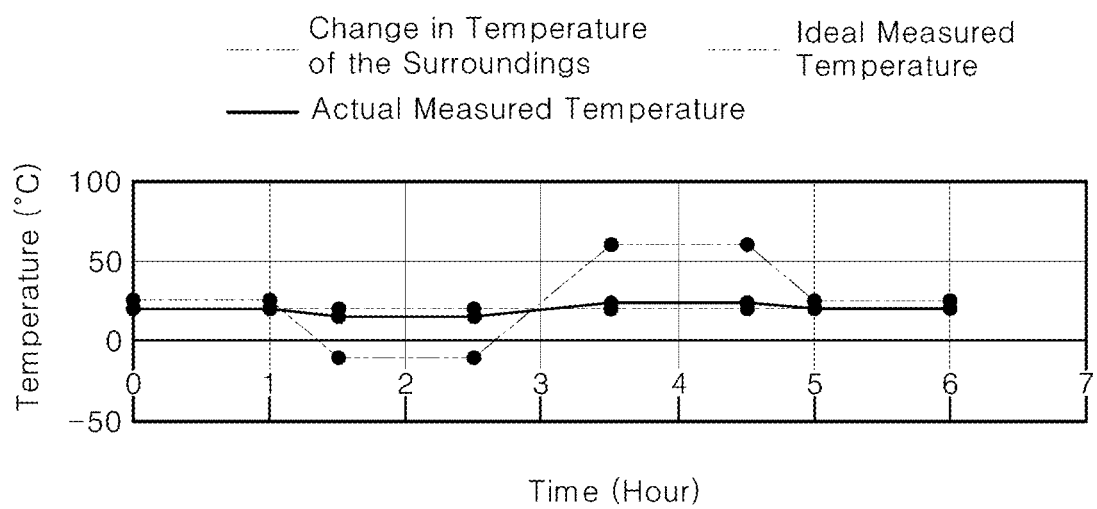
FIG. 9 is a graph depicting change of a measured temperature with change in temperature of the surroundings of a thermocouple according to another embodiment of the present disclosure.

FIG. 9 is a graph depicting change of a measured temperature with change in temperature of the surroundings of a thermocouple according to another embodiment of the present disclosure.

FIG. 9 exemplarily illustrates hardware in which a profile of the measured temperatures according to change in temperature of the surroundings gives measured temperatures higher than ideal measured temperatures at a low temperature (below 0° C.), and measured temperatures lower than ideal measured temperatures at a high temperature (above 0° C.) as shown in FIG. 5. However, there may be a temperature profile which the temperatures change in the opposite way.

That is, if a profile of measured temperatures according to change in temperature of the surroundings gives measured temperatures lower than ideal measured temperatures at a low temperature (below 0° C.) and measured temperatures higher than ideal measured temperatures at a high temperature (above 0° C.), the compensation factor may be assigned a sign opposite to the sign assigned in step S206 of generating a compensated conversion count of FIG. 7.

For example, in the case where a temperature actually measured by the thermistor 220 at a temperature (low temperature) lower than 0° C. is lower than an ideal measured temperature, and a temperature actually measured by the thermistor 220 at a temperature (high temperature) higher than 0° C. is higher than an ideal measured temperature, the positive sign (+) may be applied to the compensation factor if the temperature of the thermistor 220 is lower than the predetermined reference room temperature (preferably, a temperature between 20° C. and 30° C., and more preferably, about 25° C.), the negative sign (−) may be applied to the compensation factor if the temperature of the thermistor 220 is higher than the predetermined reference room temperature, and '0' may be applied to the compensation factor if the temperature of the thermistor 220 is equal to the predetermined reference room temperature.

As described above, some embodiments of the present disclosure provides a method for performing reference junction compensation and temperature drift compensation together using a thermistor necessary for the reference junction compensation in a temperature measurement device using a thermocouple.

However precise the measurement circuit may be, an error occurs according to temperature drift. Some embodiments of the present disclosure enables the temperature measurement device using a thermocouple to perform temperature drift compensation without providing an additional component or circuit by extracting a profile of measured temperatures according to temperature drift through a test and correcting the profile through the procedure of reference junction compensation. An effect of some embodiments of the present disclosure is illustrated in FIG. 5, and FIG. 6 shows that a result close to ideal measured temperatures can be obtained.

In some embodiments of the present disclosure, a measurement signal processing procedure performed by a conventional temperature measurement device using a thermocouple is used. However, a different reference junction compensation table is used in step S108 of FIG. 4, and a procedure of generating a count used for the reference junction compensation table is illustrated in FIG. 7.

In addition, since some embodiments of the present disclosure does not require a separate component or change of hardware, it is applicable to design a new temperature measurement device using a thermocouple. Moreover, some embodiments of the present disclosure enables the effect of temperature drift compensation to be implemented in the conventional temperature measurement device using a thermocouple by changing firmware through a test.

Further, the most important procedure of some embodiments of the present disclosure is determination of a compensation coefficient of FIG. 7 (S204), and a proper coefficient may be found through a trial and error method. By using the compensation coefficient determined in this way, a temperature measurement device using a thermocouple which is robust to change in temperature of the surroundings may be permitted. In addition, the temperature measurement device using the thermocouple can stably measure a temperature in an environment in which the temperature of the surroundings of the temperature measurement device changes significantly, and therefore the quality of thermocouple signal conversion may be improved.

In addition, since the thermocouple 100 comes in various types (e.g., B, R, S, K, E, J, T, N), the influence of temperature drift may differ among sensors. Accordingly, a compensation count table proper for a specific thermocouple may be extracted through the method proposed in some embodiments of the present disclosure.

Further, precision of the temperature measurement device using a thermocouple to temperature is divided into a room temperature region and an out-of-room temperature region in an available temperature section. The degree of a measurement error according to temperature drift is provided to the user by indicating precision for each of the room temperature region and the out-of-room temperature region or by separately indicating a temperature coefficient.

In addition, according to an embodiment of the present measure, the precision or temperature coefficient for the out-of-room temperature region may be enhanced. In some cases, precision close to the precision for the room temperature may be obtained. If the precision for the out-of-room temperature region close to the precision for the room temperature can be obtained, may be a great advantage for the user who uses the temperature measurement device using the thermocouple.

With a method for temperature drift compensation temperature measurement device using the thermocouple 100 according to another embodiment of the present disclosure, temperature drift may be compensated for through reference junction compensation alone using the thermistor 220 for the reference junction compensation without providing a separate temperature measurement element. Thereby, precision of measured temperatures may not change even if the temperature of the surroundings of the temperature measurement device changes. In addition, manufacturing costs may be effectively reduced.

In addition, according to an embodiment of the present disclosure, temperature drift may be corrected through implementation of firmware without an additional circuit or device for temperature drift compensation. In addition, the reduction of course, temperature drift compensation may be implemented even in a product including fixed hardware along with a cost saving effect. Further, costs of implementation of a module may be reduced, while the disadvantage of the conventional method is addressed. In addition, utility of efficient configuration for the method for temperature drift compensation of the temperature measurement device using the thermocouple 100 may be provided by eliminating configuration complexity of the conventional method.

Although embodiments of a method for temperature drift compensation of a temperature measurement device using a thermocouple of the present disclosure have been disclosed for illustrative purposes, the present disclosure is not limited thereto. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for compensating for temperature drift of a temperature measurement device comprising a thermocouple and a thermistor for reference junction compensation through the reference junction compensation, the method comprising:
   acquiring an analog voltage of a thermistor through a constant current source;
   converting the acquired analog voltage into a digital count;
   calculating a temperature difference between each temperature from an RT table showing resistance values according to temperatures of the thermistor and a predetermined reference room temperature;
   calculating a compensation factor by multiplying the calculated temperature difference by a predetermined compensation coefficient;
   calculating a compensated digital count using the converted digital count and the calculated compensation factor, based on the predetermined reference room temperature; and
   measuring a temperature of a thermocouple through a reference junction compensation using a temperature of the thermistor corresponding to the compensated digital count.

2. The method according to claim 1, wherein the predetermined reference room temperature is between 20° C. and 30° C.

3. The method according to claim 1, wherein the predetermined compensation coefficient is set in proportion to a difference in a temperature drift, and has a value between 0.5 and 1.5.

4. The method according to claim 1, wherein the compensated digital count is calculated by:

Compensated digital count=the converted digital count×(100+the compensation factor)%.

5. The method according to claim 4, wherein, when a temperature actually measured by the thermistor at a temperature below 0° C. is higher than a first ideal measured temperature, and the temperature actually measured by the thermistor at a temperature above 0° C. is lower than a second ideal measured temperature,
   a negative sign (−) is applied to the compensation factor when the temperature of the thermistor is lower than the predetermined reference room temperature, a positive sign (+) is applied to the compensation factor when the temperature of the thermistor is higher than the predetermined reference room temperature, '0' is applied to the compensation factor when the temperature of the thermistor is equal to the predetermined reference room temperature.

6. The method according to claim 5, wherein the first ideal measured temperature and the second ideal measured temperature have the same temperature value.

7. The method according to claim 4, wherein, when a temperature actually measured by the thermistor at a temperature below 0° C. is lower than a first ideal measured temperature, and the temperature actually measured by the thermistor at a temperature above 0° C. is higher than a second ideal measured temperature, a positive sign (+) is applied to the compensation factor when the temperature of the thermistor is lower than the predetermined reference room temperature, a negative sign (−) is applied to the compensation factor when the temperature of the thermistor is higher than the predetermined reference room temperature, '0' is applied to the compensation factor when the temperature of the thermistor is equal to the predetermined reference room temperature.

8. The method according to claim 7, wherein the first ideal measured temperature and the second ideal measured temperature have the same temperature value.

9. The method according to claim 1, wherein the predetermined compensation coefficient is adjusted through a trial and error method.

\* \* \* \* \*